March 26, 1957 — L. D. HADFIELD — 2,786,888

DEFLECTION AND ACCELERATING VOLTAGE CORRECTION CIRCUITS FOR FLYING SPOT FILM SCANNERS

Filed June 25, 1952 — 3 Sheets-Sheet 1

INVENTOR
LLOYD DYSON HADFIELD
BY Ralph E. Atherton
ATTORNEY

INVENTOR
LLOYD DYSON HADFIELD
BY Ralph E. Atherton
ATTORNEY

INVENTOR
LLOYD DYSON HADFIELD
BY Ralph E. Atherton
ATTORNEY

United States Patent Office 2,786,888

Patented Mar. 26, 1957

2,786,888

DEFLECTION AND ACCELERATING VOLTAGE CORRECTION CIRCUITS FOR FLYING SPOT FILM SCANNERS

Lloyd Dyson Hadfield, Salisbury, South Australia, Australia, assignor to Electric & Musical Industries Limited, Hayes, England, a British company Application June 25, 1952, Serial No. 295,441

Claims priority, application Great Britain June 28, 1951

8 Claims. (Cl. 178—7.2)

Figures 2, 3, 4:
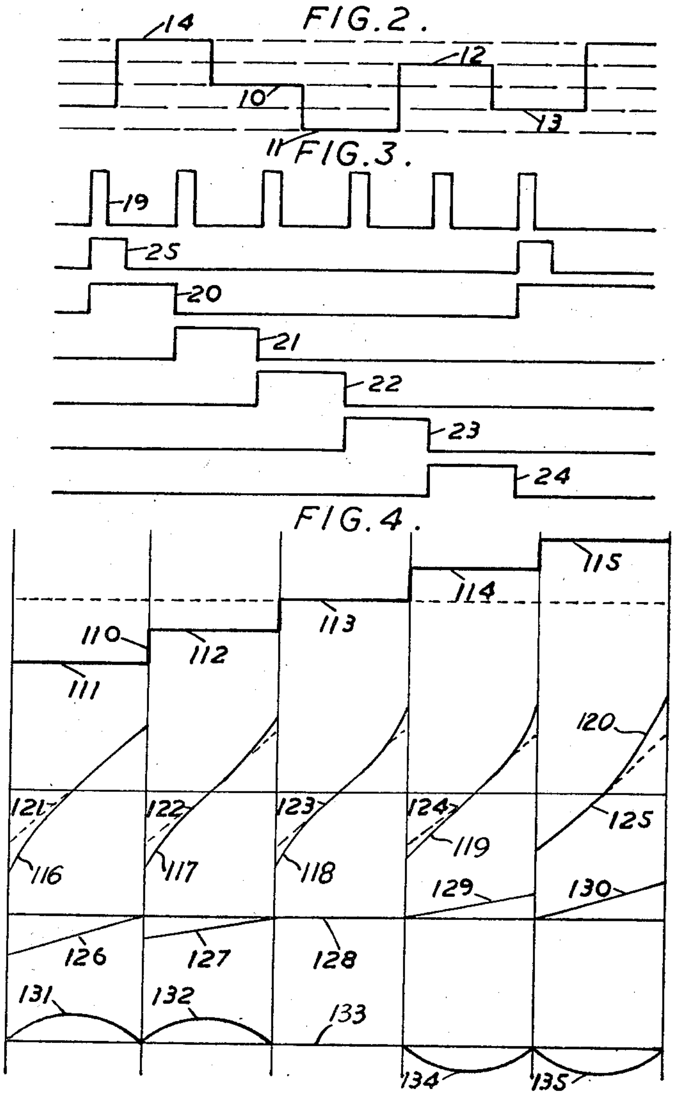

This invention relates to cathode ray tube arrangements for scanning films.

In a film scanning system intended for use in television transmission and described in the specification of British Patent No. 673,752 a film frame is scanned by means of a luminescent scanning spot that is formed on the screen of a cathode ray tube and made to trace out a scanned patch and picture signals are generated by means of a photocell responsive to light derived from the spot after having passed through the film. In said specification scanning of a further frame is carried out by a re-scanning of the same film frame after the scanned patch on said screen has been displaced in the direction of the motion of the film.

Difficulties are encountered in this system on account of the non-uniformity of deflection sensitivity of the beam over the screen of the tube. This gives rise to a change in frame height when the scanned patch is displaced. Moreover when the scanned patch is not occupying a central area of the screen the spacing of the lines varies throughout a frame height. Both these effects are undesirable, particularly in interlaced scanning. An object of the present invention is to overcome these difficulties.

In the system of film scanning above referred to difficulty is also encountered by reason of variation of the E. H. T. applied to the cathode ray tube. Such variations of accelerating potential cause variations in the deflection sensitivity of the cathode ray beam so that the displacements of the scanned patch tend to change with variations of the E. H. T. supply. This results in a disturbance of the lines of the frames and it is a further object of the present invention to reduce this disturbance.

According to the present invention there is provided in a cathode ray tube film scanner of the continuously moving film type, a cathode ray tube having a fluorescent screen, said tube having means for generating an electron beam to produce a light spot on said screen, a photo electric tube to receive said spot after passing through said film, means for deflecting the beam of said tube transversely with respect to the film at line frequency, means for deflecting said beam in a direction parallel to the motion of the film at frame frequency, means for displacing the patch traced out on the screen of said tube during one frame scan to cause said beam to scan another patch on said screen during a further frame scan, means for generating a sawtooth waveform of frame frequency, means for superimposing said waveform upon said means which deflect said beam at frame frequency during the period of one frame scan to equalise the amplitude of the respective frame scans, and means for generating a further waveform at frame frequency and for superimposing said further waveform upon said means for deflecting said beam at frame frequency during the period of said further frame scan to render more uniform the separation between interlaced lines. Preferably said latter component is of parabolic form.

According to a feature of the present invention in order to reduce disturbance of the lines of the frames as a result of variation of displacement of the beam with variation of the accelerating potential applied to said tube, means are provided for deriving from said accelerating potential a control proportional to said variation of said potential and for applying said control to modify the motion of the beam parallel to the motion of the film.

Figures 5, 6:
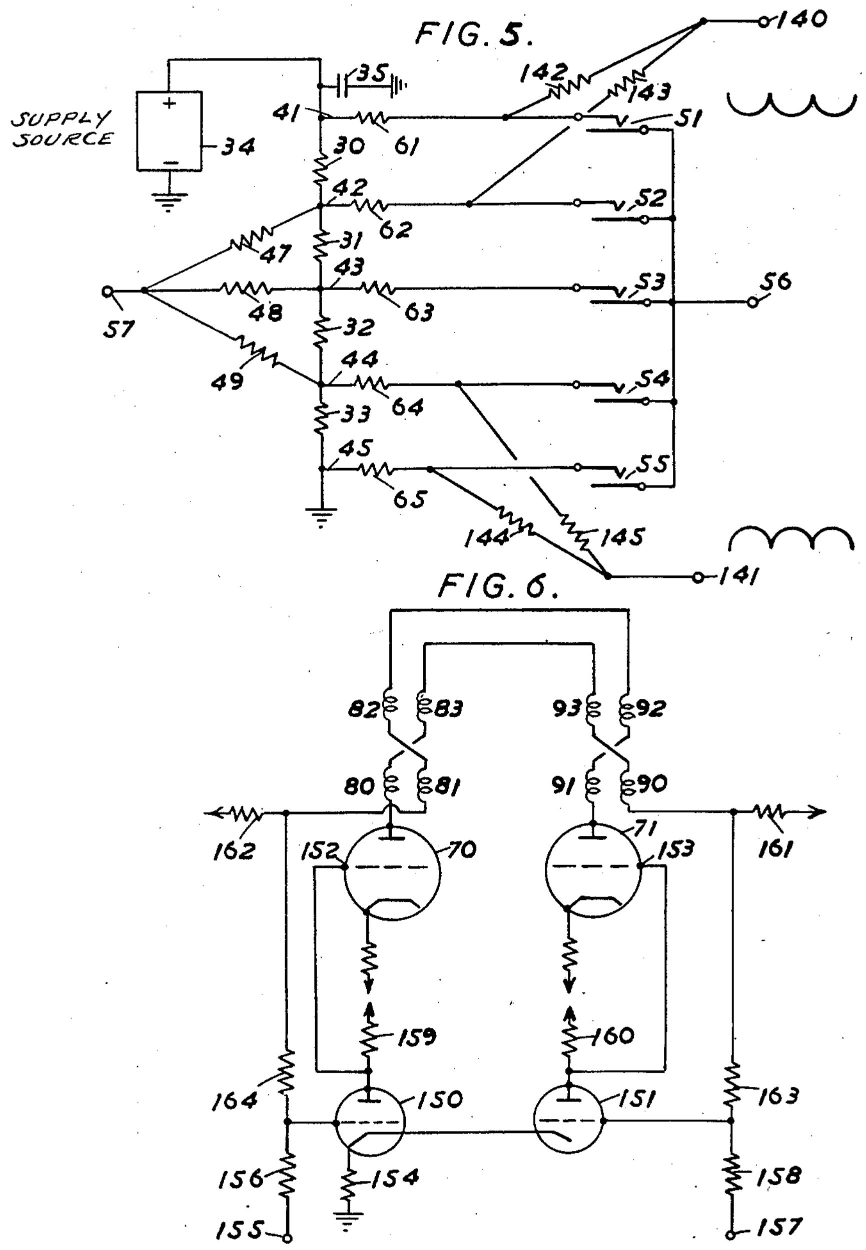
Figure 7:
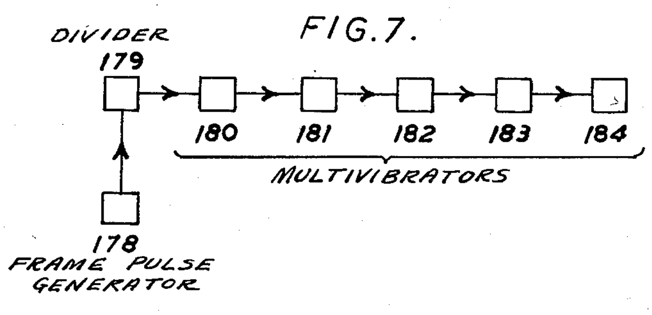
Figures 1, 8:
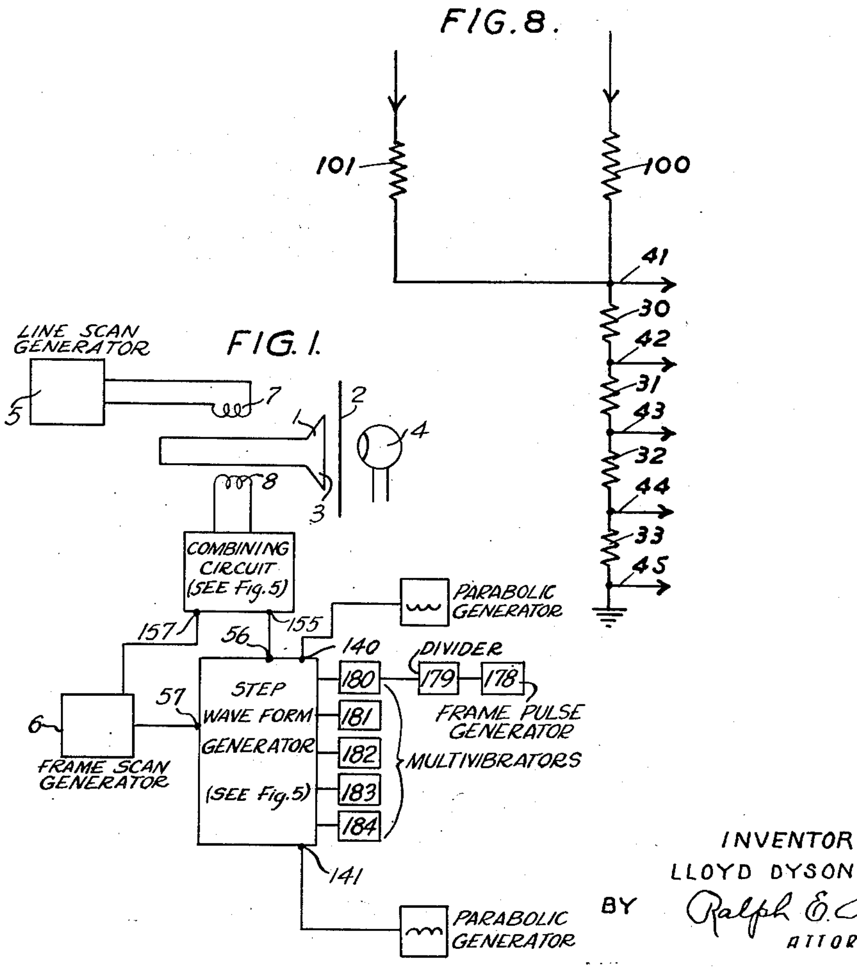

In order that the said invention may be clearly understood and readily carried into effect it will now be more fully described by way of example with reference to the accompanying drawings, in which:

Figure 1 illustrates a general schematic block diagram of a cathode ray film scanner in accordance with the invention, Figures 2, 3 and 4 illustrate various waveforms employed in the circuit shown in Figure 1, Figure 5 illustrates the step waveform generator shown in Figure 1, Figure 6 illustrates the combining circuit shown in Figure 1, Figure 7 illustrates the multivibrator circuit for operating the step waveform generator shown in Figure 5, and Figure 8 illustrates a modification of the step waveform generator shown in Figure 1.

Referring to Figure 1, reference 1 indicates a cathode ray tube and reference 2 a portion of the film which is arranged so that it can be caused to move with continuous motion in front of the screen 3 of the cathode ray tube. Reference 4 indicates a photocell disposed on the opposite side of the film to the screen 3 and arranged so that light from the scanning spot on the screen 3 falls upon the photo-sensitive surface of the photocell 4 after traversing the transparency of the film 2. The light from said spot is focused onto the film and then onto the photo-sensitive surface of the photocell by optical means not shown.

Rectangles 5 and 6 indicate respectively line scanning and frame scanning circuits, these circuits being connected to line deflecting and frame deflecting coils 7 and 8 disposed about said tube the latter coils being shown in more detail in Figure 6. Current fed by the line deflecting circuit 5 to the coil 7 causes the beam of the cathode ray tube to be deflected transversely to the motion of the film and current from the frame deflecting circuit causes said beam to be deflected in a direction parallel to the motion of the film. Said spot is thus caused to scan out a patch on said screen and the amplitude of frame scan is so chosen having regard to the motion of the film and the height of a film frame that in the time of one frame scan the film frame is scanned from bottom to top. Figure 1 also illustrates the manner in which the circuits shown in Figures 5, 6 and 7 are combined to overcome the difficulties hereinbefore referred to.

The motion of said film is such that the film is moved at 24 film frames per second. Furthermore the repetition frequency of the frame scanning currents generated by the circuit 6 is 60 per second. In these circumstances and for the purpose of obtaining an interlaced scanning of the film the scanned patch on the screen 3 is caused to be shifted once per frame in a manner so that in five complete frame scanning periods the patch has occupied five different positions on said screen as described in the aforementioned British Patent No. 673,752, the cycle thereafter being repeated. The displacements of said patch are indicated by the step waveform shown in Figure 2 in which time is represented horizontally and displacements of the patch vertically. Each step has a duration of one frame period and the step indicated by the reference 10 shows the patch in its undisplaced position on the screen 3. In the following frame period the patch is displaced to an extreme position below its undisplaced position as indicated by the step 11. In the next frame the patch is displaced to a level above the level 10 as shown by the step 12. The step 12 does not represent an extreme displacement in the upward direction but a position intermediate the extreme position indicated by the step 14 and the undisplaced position of the step 10. Step 13 whilst following step 12 occupies an intermediate position below the level 10. Steps 14 and 11 lie equally above and below the level 10 and steps 12 and 13 are likewise equally disposed above and below the level 10.

The waveform of Figure 2 is generated by the frame scanning circuit 6 which also generates the frame deflecting current used for setting up the scan patch on the screen 3. Said frame deflecting currents are of sawtooth waveform and these currents are present in the deflecting coil 8 together with currents of the step waveform of Figure 2. Referring to Figure 5 said step waveform is generated as follows: a stabilised source of supply shown as 34 is used to feed the resistive potentiometer formed by the series connection of the resistance elements 30, 31, 32 and 33 one end of which is effectively grounded. Tapping points 41, 42, 43, 44 and 45 in this order are provided on the potentiometer between said source and ground and at the ends of said resistance elements to afford a graded sequence of fixed potentials, these potentials corresponding respectively to the levels of the steps of the waveform of Figure 2. Associated respectively with said tapping points are switched relays 51, 52, 53, 54, 55 for connecting each tapping point to a common output terminal 56 and means, not shown in Figure 5 but described subsequently with reference to Figure 7, are furthermore provided for operating said relays in sequence so that the stepped waveform of Figure 2 is set up at said common terminal. Referring to Figure 6 this waveform and a sawtooth waveform also generated by circuit 6 are applied at terminals 155 and 157 and are fed via resistances 156 and 158 to respective control grids of a cathode coupled pair 150, 151 having the cathode coupling resistance 154 so that the waveforms are mixed at the anodes of the pair. Drives from these anodes are fed to the respective control grids of a push-pull output stage comprising the push-pull pair of valves 70, 71 arranged to feed the scanning coils 80, 81, 82, 83, 90, 91, 92, 93 which represent in greater detail the scanning coils 8 of Figure 1. In order to provide a high degree of stability and linearity of action a large amount of negative feedback is applied over the two amplifying stages constituted by the cathode coupled pair 150, 151 and the push-pull output pair 70, 71. This feedback is derived in symmetrical manner from resistances 161, 162 connected respectively in series in the anode circuits of the output valves 70, 71 and the voltages set up across these resistances are fed via resistances 164 and 163 respectively to the control grids of the cathode coupled valves 151, 150.

The sawtooth deflecting waveform that is mixed with the stepped waveform in the cathode coupled pair circuit may be generated by any suitable circuit. A suitable circuit is described in the specification of British patent specification No. 682,864 in which a charging condenser is charged by means of a charging resistance and discharged by discharging means so as to set up sawtooth variations of potential which are applied to the control grid of a valve arranged in cathode follower manner so that the potential generated by the charging condenser is repeated at the cathode of said valve to provide an output. For the purpose of enabling said output to possess a large amplitude and yet remain highly linear the sawtooth variation at said cathode is integrated by an integrating circuit and the integrated voltage is applied to the terminal of said charging condenser not connected to the control electrode of said valve. The parabolic variations of voltage thus injected into the charging circuit has the effect, as described in the specification of British patent specification No. 682,864, of reducing the normal exponential distortion inherent in charging a charging condenser through a charging resistance.

Said relays are operated by switching pulses generated by respective multivibrators 180, 181, 182, 183, 184 of a cascade of five multivibrators as shown in Figure 7. These multivibrators are arranged so that the back edge of the pulse generated by the first multivibrator 180 triggers the second multivibrator 181 and the back edge generated by the second multivibrator 181 triggers the next multivibrator and so on so that each multivibrator is caused to generate a pulse of the duration of one frame, these pulses following in the immediate succession one after the other. The sequence of pulses is shown in Figure 3 by the pulse waveforms 20, 21, 22, 23 and 24. Waveform 20 corresponds to the waveform generated by the first multivibrator 180 of the cascade, waveform 21 by the second multivibrator 181 and so on. The first multivibrator 180 is triggered by pulses of the waveform indicated by 25 in Figure 3. The pulses of this waveform occur at ⅕ the frame repetition rate and are set up by the divider circuit 179 shown in Figure 7 and dividing in the ratio of one to five. The divider circuit has applied to it pulses of frame repetition frequency deriving from the frame pulse 178 and these pulses are indicated by the waveform 19 of Figure 3.

As already explained displacement of the scanned patch results in disturbance of the interlace of the lines of the picture due to the variation in deflection sensitivity of the beam of the cathode ray tube with displacement of the patch.

In order to overcome this difficulty correction components are generated by the circuit 6 and these components are of two forms. One type of component is of sawtooth character and the other type parabolic. The function of the sawtooth type of component is to render the height of the scanned patch the same for all displacement positions.

The function of the parabolic type of component is to reduce the variation of spacing between lines due to deflection of the scanned patch from the central undeflected position of the patch.

The nature of the correcting components is made more clear by referring to Figure 4. In this figure the step waveform 110 shows the various levels occupied by the scanned patch during a complete cycle of five frame periods and in this respect is like the step waveform of Figure 2. As distinct from Figure 2, however, the correct sequence of the levels is not shown, the levels on the other hand being shown in their sequence from bottom to top of the cathode ray screen. Thus step 111 shows the lowest position occupied by the patch, stop 112 shows the intermediate position below the central position 113, 114 shows the intermediate position above 113 and below the extreme upper position 115. Immediately below the step waveform in Figure 4 and corresponding to the steps of the waveform are indicated the nature of the frame deflections that would occur in the event of the application of the same frame deflection currents during frame deflection for each level of the scanned patch. Thus 116 indicates the nature of the deflection when the patch occupies level 111, 117 the form when the patch occupies level 112, 118 the form corresponding to the undeflected position 113, 119 and 120 corresponding to step levels 114 and 115 and having similar but opposite curvature to 117 and 116 respectively. The dotted lines 121, 122, 123, 124, 125 show the linear and identical deflections required for each displacement position of the scanned patch. The respective differences between the curves 116, 117, 118, 119 and 120 and the required deflections 121, 122, 123, 124 and 125 constitute the distortions in the various frame positions which require to be compensated. The lines 126, 127, 128, 129 and 130 show respectively below the deflection curves 116, 117, 118, 119 and 120, the sawtooth components of the distortions present in said curves. 131, 132, 133, 134 and 135 show respectively the parabolic components of said distortions. It is found in practice sufficient to compensate for these two components. It will be observed that the sawtooth and parabolic distortion components for the undeflected position as shown respectively by 128 and 133 are zero components. The circuit arrangement of Figure 5 shows means by which the sawtooth curve components to compensate the sawtooth distortion components above described may be applied to effect the compensation. In this figure as described above the resistances 30, 31, 32 and 33 form the resistive divider aforementioned for setting up the levels of the step waveform of Figure 2, and said tapping points at which are established the respective fixed potentials for setting up these levels are the points 41, 42, 43, 44 and 45. The tapping point 45 is effectively grounded as indicated and the tapping point 41 which is fed from said stabilised source of supply 34 is also effectively grounded, namely, by means of the condenser 35 which provides an effective ground at the frame frequency currents flowing in the circuit. Said tapping points are connected respectively to the relays aforementioned and denoted respectively by the references 51, 52, 53, 54 and 55 by the resistances 61, 62, 63, 64 and 65. As previously stated said relays connect said tapping points to the common output terminal 56. Sawtooth components which may be used to compensate said sawtooth distortion components and in a manner to be described are set up at terminal 56. In order to set up said sawtooth components at terminal 56 a sawtooth variation of frame repetition frequency is applied to the input terminal 57 which is connected to the junction of resistances 47, 48 and 49 and individually through these resistances to tapping points 42, 43 and 44 respectively.

By virtue of these connections there are set up at said tapping points sawtooth variations similar to the sawtooth variations at terminal 57 but of lesser amplitude. By suitably choosing the values of resistances 47, 48 and 49 the sawtooth variations at tapping points 42 and 44 are made equal and smaller than the variation appearing at tapping point 43. It will be seen that sawtooth correction components of the correct sense and magnitude for correcting said sawtooth distortion components can be set up in turn at terminal 56 as said relays 51, 52, 53 54 and 55 are operated in sequence, if there is superimposed at terminal 56 as each relay connects the terminal 56 to a corresponding one of said tapping points a sawtooth variation of the constant amplitude but of such magnitude and sense that when terminal 56 is connected by relay 53 to tapping point 43 no resultant sawtooth variation appears at terminal 56. By suitable choice of component values there can thus be set up in sequence at 56 the sawtooth correction components required for compensating said sawtooth distortion components. Means are not shown in Figure 5 for superimposing on terminal 56 said sawtooth component that is effectively subtracted in turn from the potentials applied to terminal 56 via said relays and in practice in the interests of simplicity direct super-position on the terminal 56 is not employed. On the other hand the super-position is achieved in effect by an adjustment of the amplitude of sawtooth variation applied to the grid of the long tail pair 150, 151 shown in Figure 6 to the other grid of which pair is applied the potentials appearing at terminal 56.

The parabolic components of correction are set up at the terminal 56 by feeding in parabolic components of variation at frame frequency at terminals 140 and 141. Said parabolic variations applied to terminals 140 and 141 are of equal amplitude but of opposite sense. Terminal 140 is connected via resistances 142 and 143 to the junction points respectively of resistance 61 and relay 51 and resistance 62 and relay 52. Likewise terminal 141 is connected by resistances 144 and 145 respectively to the junction points of resistance 65 and relay 55 and resistance 64 and relay 54. By applying said parabolic variations to said terminals 140 and 141 in the appropriate sense and by appropriately choosing resistances 142, 143, 144 and 145 the required parabolic correction components are set up at terminal 56 to compensate said parabolic distortion components. The parabolic variations applied to said terminals 140 and 141 are preferably derived from the integrated sawtooth variations set up by the sawtooth generating circuit above referred to and described in the specification of British Patent No. 682,864, in which the sawtooth variations are set up at the cathode of said cathode follower valve.

Figure 6 already referred to shows in addition to the amplifier arrangement previously described and including the long tail pair 150, 151 and the push-pull pair 70, 71 a diagrammatic arrangement of the scanning coils fed by said amplifier by which a high degree of symmetry of the scanned patch is obtained. Referring to said coil arrangement coils 80, 81, 82 and 83 are coils mounted as one assembly on one of the limbs of a deflecting yoke and coils 90, 91, 92 and 93 are corresponding coils mounted as a separate assembly on the opposite limb of said yoke. Said yoke is of re-entrant type and preferably a rectangular yoke and said limbs are disposed on opposite sides of the neck of the cathode ray tube. Coils 80, 83, 93 and 90 are connected in series in the anode circuit of output valve 70 and coils 81, 82, 92 and 91 are connected in series in the anode circuit of the other of said output valves, namely valve 71. Furthermore, the coils on the two limbs of said yoke are so connected and arranged as to set up fluxes in opposition in said yoke so as to set up a substantially homogeneous field in the space through which the cathode ray beam passes. Said yoke may, if desired, be of circular form, namely toroidal, the coil assembly being disposed oppositely on the yoke.

Referring to Figure 8 the resistances 30, 31, 32 and 33 form the aforesaid potential divider described with reference to Figure 5 and which is grounded at one end and fed at the other end by a regulated source of high tension supply. As shown in Figure 8 said source feeds said divider through resistance 100. At the tapping points 41, 42, 43, 44 and 45 on said potential divider there are set up as before described fixed potentials by means of which said cathode ray beam can be deflected to any one of five different positions, said deflection of said beam to said different positions being effected by connecting the input circuit of the beam deflecting circuit to different ones of said tapping points. As described above variation of the accelerating potential applied to the cathode ray tube causes variation of the positions assumed by said beam.

In accordance with the invention there is caused to flow in resistances 30, 31, 32 and 33 a current that is derived from the source of accelerating potential, said current being injected at point 41 of said divider through resistance 101, the end of resistance 101 not connected to point 41 being connected to the output terminal of the E. H. T. supply for said cathode ray tube. When the potential supplied by said E. H. T. supply varies said current in said divider accordingly varies and thus causes the potentials at the tapping points 41, 42, 43 and 45 to vary. By adjusting the value of resistance 101 so that the current fed through this resistance is equal to the current fed through the resistance 100 the changes of potential at said tapping points may be caused to have such magnitude as to compensate for the effect of the variation of said accelerating potential upon the deflection sensitivity of said beam. The various displaced positions of said beam are thus rendered independent of variations of the E. H. T. supply.

What I claim is:

1. In a cathode ray tube film scanner of the continuously moving film type, a cathode ray tube having a fluorescent screen, said tube having means for generating an electron beam to produce a light spot on said screen, a photo electric tube to receive said spot after passing through said film, means for deflecting the beam of said tube transversely with respect to the film at line frequency, means for deflecting said beam in a direction parallel to the motion of the film at frame frequency, means for displacing the patch traced out on the screen of said tube during one frame scan to cause said beam to scan another patch on said screen during a further frame scan, means for generating a sawtooth waveform of frame frequency, means for superimposing said waveform upon said means which deflect said beam at frame frequency during the period of one frame scan to equalise the amplitude of the respective frame scans, and means for generating a further waveform at frame frequency and for superimposing said further waveform upon said means for deflecting said beam at frame frequency during the period of said further frame scan to render more uniform the separation between interlaced lines.

2. In a cathode ray tube film scanner according to claim 1 and in which variation of an accelerating potential of said cathode ray tube causes disturbances of the interlacing of the lines of a picture, means for deriving from said accelerating potential a control signal proportional to the variation of said accelerating potential, and means for applying said control signal to modify the displacements of said beam parallel to the motion of said film.

3. In a cathode ray tube film scanner of the continuously moving film type, a cathode ray tube having a fluorescent screen, said tube having means for generating an electron beam to produce a light spot on said screen, a photo electric tube to receive said spot after passing through said film, means for deflecting the beam of said tube transversely with respect to the film at line frequency, means for deflecting said beam in a direction parallel to the motion of the film at frame frequency, means for displacing the patch traced out of the screen of said tube during one frame scan to cause said beam to scan at least two further different patches on said screen during further frame scans, means for generating sawtooth components of frame frequency and of different amplitudes, means for selectively superimposing said components upon said means which deflect said beam at frame frequency during the periods of said further frame scans to equalise the amplitude of the respective frame scans, and means for generating a further waveform at frame frequency and for superimposing said further waveform upon said means for deflecting said beam at frame frequency during the period of said further frame scan to render more uniform the separation between interlaced lines.

4. In a cathode ray tube film scanner according to claim 3 and in which variation of an accelerating potential of said cathode ray tube causes disturbances of the interlacing of the lines of a picture, means for deriving from said accelerating potential a control signal proportional to the variations of said accelerating potential, and means for applying said control signal to modify the displacements of said beam parallel to the motion of said film.

5. In a cathode ray tube film scanner of the continuously moving film type, a cathode ray tube having a fluorescent screen, said tube having means for generating an electron beam to produce a light spot on said screen, a photo electric tube to receive said spot after passing through said film, means for deflecting the beam of said tube transversely with respect to the film at line frequency, means for deflecting said beam in a direction parallel to the motion of the film at frame frequency, means for displacing the patch traced out on the screen of said tube during one frame scan to cause said beam to scan another patch on said screen during a further frame scan, means for generating a sawtooth waveform of frame frequency, means for superimposing said waveform upon said means which deflect said beam at frame frequency during the period of one frame scan to equalise the amplitude of the respective frame scans, and means for generating a waveform of parabolic form at frame frequency and for superimposing said waveform of parabolic form upon said means for deflecting said beam at frame frequency during the period of said further frame scan to render more uniform the separation between interlaced lines.

6. In a cathode ray tube film scanner according to claim 5 and in which variation of an accelerating potential of said cathode ray tube causes disturbances of the interlacing of the lines of a picture, means for deriving from said accelerating potential a control signal proportional to the variation of said accelerating potential, and means for applying said control signal to modify the displacements of said beam parallel to the motion of said film.

7. In a cathode ray tube film scanner of the continuously moving film type, a cathode ray tube having a fluorescent screen, said tube having means for generating an electron beam to produce a light spot on said screen, a photo electric tube to receive said spot after passing through said film, means for deflecting the beam of said tube transversely with respect to the film at line frequency, means for deflecting said beam in a direction parallel to the motion of the film at frame frequency, means for displacing the patch traced out on the screen of said tube during one frame scan to cause said beam to scan at least two further different patches on said screen during further frame scans, means for generating sawtooth components of frame frequency and of different amplitudes, means for selectively superimposing said components upon said means which deflect said beam at frame frequency during the periods of said further frame scans to equalise the amplitude of the respective frame scans, and means for generating a waveform of parabolic form at frame frequency and for superimposing said waveform of parabolic form upon said means for deflecting said beam at frame frequency during the period of said further frame scans to render more uniform the separation between interlaced lines.

8. In a cathode ray tube film scanner according to claim 7 and in which variation of an accelerating potential of said cathode ray tube causes disturbances of the interlacing of the lines of a picture, means for deriving from said accelerating potential a control signal proportional to the variation of said accelerating potential, and means for applying said control signal to modify the displacements of said beam parallel to the motion of said film.

References Cited in the file of this patent

UNITED STATES PATENTS

| | | |
|---|---|---|
| 2,250,479 | Goldmark | July 29, 1941 |
| 2,261,848 | Goldmark | Nov. 4, 1941 |
| 2,485,594 | Hallmark | Oct. 25, 1949 |
| 2,590,281 | Sziklai et al. | Mar. 25, 1952 |
| 2,625,602 | Somers | Jan. 13, 1953 |